(No Model.)
I. F. KEPLER.
VALVE FOR PNEUMATIC TIRES.
No. 583,183.  Patented May 25, 1897.
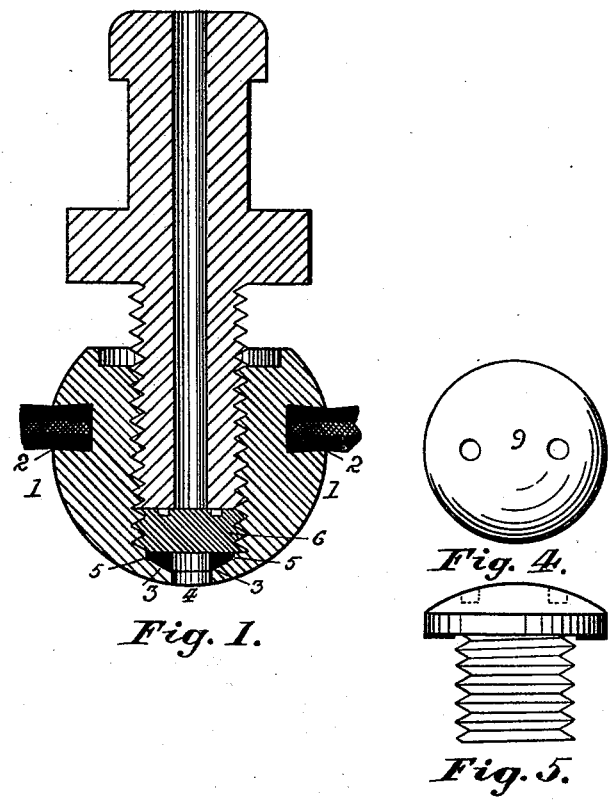
Fig. 2. Fig. 1. Fig. 4.
Fig. 3. Fig. 5.
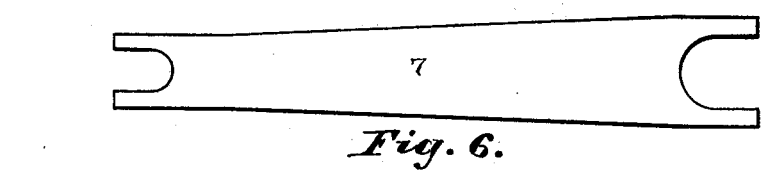
Fig. 6.
Witnesses:  
W. F. Fouse  
E. Forst
Inventor:  
Irwin F. Kepler:  
by Humphry & Humphry  
Atty. s.

UNITED STATES PATENT OFFICE.

IRWIN F. KEPLER, OF AKRON, OHIO.

VALVE FOR PNEUMATIC TIRES.

SPECIFICATION forming part of Letters Patent No. 583,183, dated May 25, 1897.

Application filed July 27, 1896. Serial No. 600,626. (No model.)

*To all whom it may concern:*

Be it known that I, IRWIN F. KEPLER, a citizen of the United States, residing at Akron, in the county of Summit and State of Ohio, have invented a certain new and useful Improvement in Valves for Pneumatic Tires, of which the following is a specification.

My invention has relation to that class of valves through which, when open, air is forced to inflate the tire, and which, when closed, operates to prevent the escape of air when the air-pump-tube tip is removed.

The object of my invention is to provide a simple and effective valve that shall be compact and permit of being vulcanized in the tire when the latter is cured and adapted to be placed in the tire at a point close to the rim without cutting the latter and that shall be so small as to offer no objection to the fork.

To the aforesaid objects my invention consists in the peculiar and novel construction, arrangement, and combination of parts hereinafter described, and then specifically pointed out in the claims, reference being had to the accompanying drawings, forming a part of this specification.

In the accompanying drawings, which are five times enlarged and in which similar reference-numerals indicate like parts in the different figures, Figure 1 is a vertical central section of my improved valve with cap removed and tip of air-pump tube inserted; Figs. 2 and 3, plan and side elevation, respectively, of locking-screw; Figs. 4 and 5, plan and side elevation, respectively, of valve cap-screw; and Fig. 6, the wrench.

Referring to the drawings, 1 is the valve-case, which is of metal and nearly spherical in form, about which is an annular channel 2, in which the edges of the orifice in the tire rest to retain the valve in place. This channel is preferably large on the inside, making it dovetailed in cross-section. Through the center of this case is an opening extending from the top to near the bottom of even diameter and internally screw-threaded, whence it is reduced, leaving a narrow annular sloping shoulder 3 about the exit 4, forming a seat for a rubber gasket 5. A short screw-threaded plug 6, adapted to be turned by the smaller end of the pin-wrench 7, Fig. 6, fits in this screw-threaded opening and when turned down rests and presses on the gasket 5 and effectually closes the valve against the escape of air. This plug has in its upper face a radial sloping notch 8 for a purpose to be stated.

The valve-opening is closed after the tire is inflated by a cap-screw 9, that meshes in the screw-threaded opening of the case and has an overhanging head that fits in and closes the annular opening in the top of the case, and in operation I place, as an additional precaution against leakage, a gasket in this annular opening under the overhanging head.

When it is necessary to inflate the tire, the cap-screw 9 is removed, the large end of the pin-wrench 7 being used for the purpose, and the plug 6 unscrewed with the smaller end of the wrench for a slight distance. The air-pump tip is then screwed down nearly to the plug 6 and air forced in until the desired inflation is secured, there being sufficient space between the threads of the plug and orifice to permit the air to pass. This air-pump tube has on its end a similar but oppositely-disposed notch to the notch 8, and when the tire is inflated this tube is screwed down against the plug until these notches engage, when by continuing the turning the plug is forced down firmly on the gasket 5, thus with the gasket effectually sealing the opening, and the air-pump tube is removed and the valve-cap replaced.

I claim as my invention—

The combination in a pneumatic-tire valve with the case having a screw-threaded opening and a reduced extension of said opening to form a gasket-seat, of a screw-threaded plug to fit said screw-threaded opening, having a radial notch in combination with an air-pump-tube tip to fit said screw-threaded opening and having an oppositely-disposed radial notch to engage the notch of said plug, substantially as shown and described.

In testimony that I claim the above I hereunto set my hand.

IRWIN F. KEPLER.

In presence of—
C. E. HUMPHREY,
C. P. HUMPHREY.